Sept. 30, 1947.  E. M. SMITH  2,428,129
TEMPERATURE MEASURING SYSTEM
Filed Dec. 1, 1943  3 Sheets-Sheet 1
FIG. 1
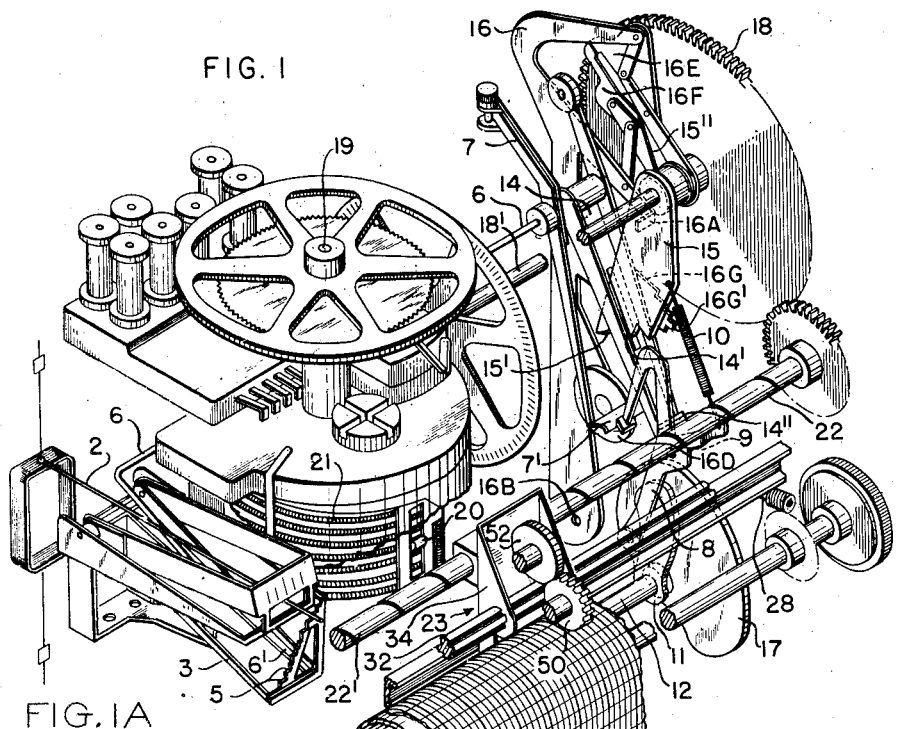
FIG. 1A
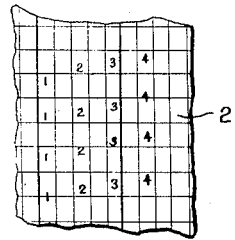
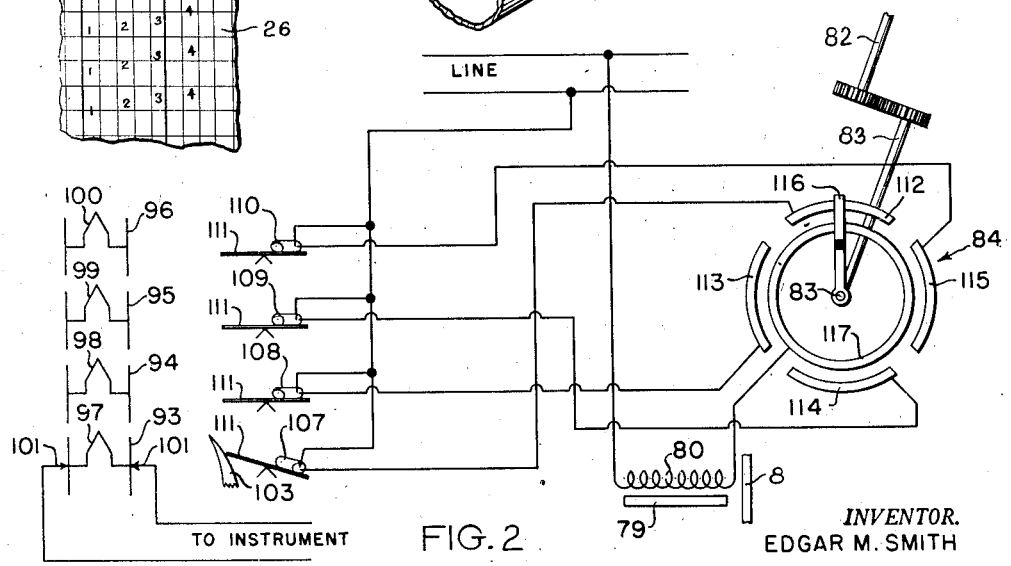
FIG. 2
INVENTOR.
EDGAR M. SMITH
BY C. B. Spangenberg
ATTORNEY.

Sept. 30, 1947.  E. M. SMITH  2,428,129
TEMPERATURE MEASURING SYSTEM
Filed Dec. 1, 1943  3 Sheets-Sheet 2
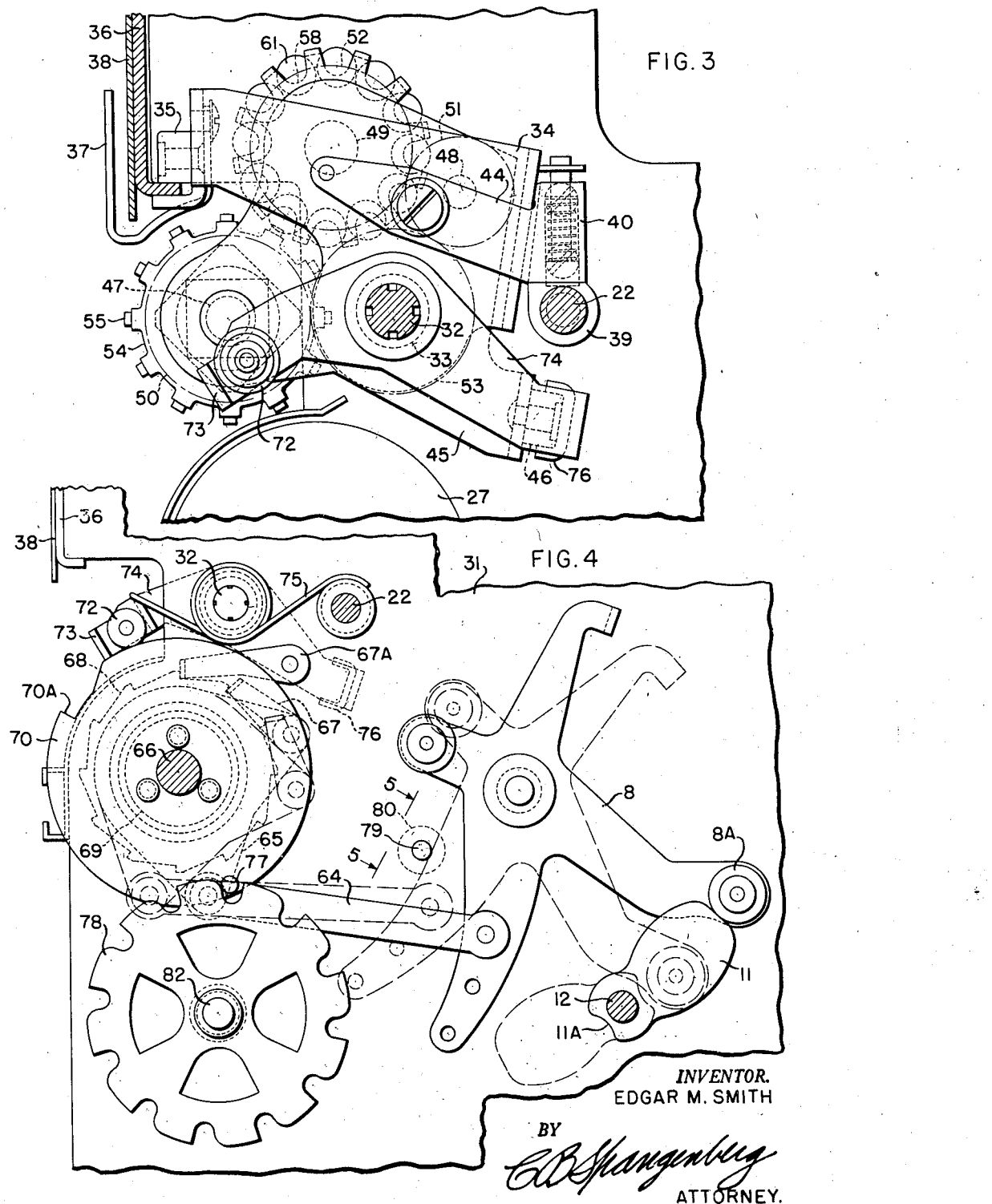
INVENTOR.
EDGAR M. SMITH
BY
ATTORNEY.

INVENTOR.
EDGAR M. SMITH

Patented Sept. 30, 1947

2,428,129

UNITED STATES PATENT OFFICE 2,428,129

TEMPERATURE MEASURING SYSTEM

Edgar M. Smith, Trenton, N. J., assignor to The Brown Instrument Company, Philadelphia, Pa., a corporation of Pennsylvania Application December 1, 1943, Serial No. 512,411

11 Claims. (Cl. 234—1.5)

The present invention relates to potentiometer recording instruments, and more particularly to multiple recording instruments of the potentiometer type in which the switching mechanism that sequentially connects the instrument to various thermocouples is operated in accordance with an external condition rather than by the instrument itself.

In most multiple potentiometer instruments in which the instrument is sequentially connected to a plurality of thermocouples, or other primary measuring elements, and in which a record is made of the temperature of each thermocouple, a means is provided to connect periodically the thermocouples to the instrument. In some instruments provision is made to connect the instrument to another thermocouple immediately after it has come into balance and a record has been made. Either of the instruments of the type mentioned require some internal mechanism in the instrument to operate the thermocouple selector switch.

At times it is desirable for the thermocouple selector switch to be operated in accordance with some external condition so that a record of the temperature will be made when some predetermined operation occurs, rather than on a time basis. In the invention disclosed herein the measurement of the temperature of a rotary kiln is used by way of example. The arrangement is such that the temperature of the kiln is recorded at a plurality of points along its length to obtain the temperature gradient therein. The mechanism is so constructed that a new thermocouple is connected to the instrument when the thermocouple reaches a position near the top of the kiln so that the kiln temperature rather than the temperature of the material therein will be recorded.

It is an object of the invention to provide a multiple potentiometer recording instrument in which the thermocouple selector switch is operated by some means external of the instrument. It is a further object of the invention to provide an instrument which will make a record of the value of a condition when some predetermined operation has taken place. Another object of the invention is to provide a recording instrument in which a record of the value of a condition will be made when that condition takes places, rather than to make a record of the value of the condition at a predetermined time.

The invention also has for its object the provision of means to make a record of the temperature gradient at predetermined points along the length of a furnace. A further object of the invention is to make a record of the temperature of the gases in a rotary kiln at a plurality of points along the length of the kiln. The embodiment of the invention disclosed is so designed that the measurement of the temperature will be made only at the time when the thermocouple being used is in the path of the gases.

While the invention herein described is shown in connection with a rotary kiln it will be obvious to those skilled in the art that it will be equally as advantageous when used in connection with other apparatus.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Figure 1 is a perspective view of the potentiometer,

Figure 1A is a view showing the type of record made by the instrument,

Figure 2 is a wiring diagram of the control system,

Figure 3 is an enlarged view of the printing mechanism of the potentiometer,

Figure 4 is an enlarged view of the print wheel operating mechanism of the potentiometer.

Figure 6:
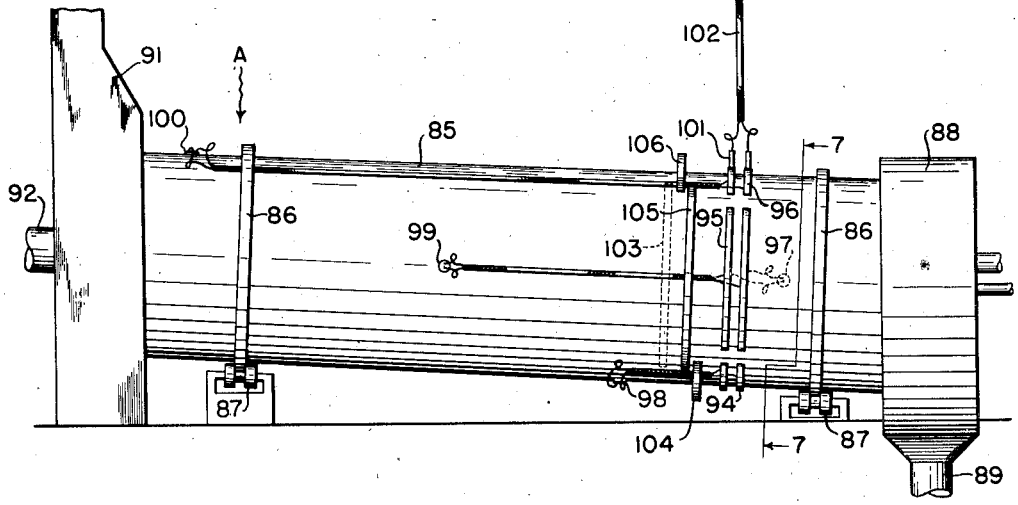
Figure 6 is a diagrammatic view of a rotary kiln and Figure 7 is a section taken on line 7—7 of Figure 6.

Referring first to Figure 6, a rotary kiln is shown at A, which kiln is to have its temperature measured at a plurality of points along its length. The measurement is made by thermocouples located at spaced points along its length, and a record is made of the temperature of each of the thermocouples by a multiple recording potentiometer B. While in the present disclosure the potentiometer is shown as being a recording instrument, it will be obvious to those skilled in the art that the instrument could also be a controlling instrument and serve to regulate in a suitable manner the supply of fuel to the kiln.

In the detailed description of the invention that is to follow the potentiometer instrument will first be described, followed by a description of those parts of the kiln necessary to the control system. An explanation of the operation of the entire system will then be made.

The potentiometer B may take the form of that shown and claimed in the C. B. Moore Patent 2,328,664 granted on September 7, 1943, with certain changes made therein in order to permit the instrument to be connected to the various thermocouples in response to rotation of the kiln. The instrument is also so arranged that consecutive records made by it will be of the temperature of different thermocouples regardless of the length of time each thermocouple is connected thereto. This instrument will, however, indicate the value of the temperature of the thermocouple connected to it at all times.

The said instrument comprises a galvanometer, having a pointer 2 which deflects in response to a condition of unbalance in a potentiometer measuring circuit. The instrument also comprises mechanical relay provisions including a constantly rotating power shaft 12, and controlled by the galvanometer pointer 2 deflecting from its normal position, for periodically rebalancing the potentiometer circuit, and for moving a recorder carriage 23 along a travelling record strip 26 as required to make a record on said strip of the varying value of the quantity measured.

The mechanism of Fig. 1, through which the deflection of the galvanometer pointer 2 controls the adjustments of the recorder carriage 23 and the rebalancing of the potentiometer circuit on a variation in the value of the quantity measured by the galvanometer, comprises a pointer position gauging element 3. The latter is pivotally supported, and in connection with the hereinafter mentioned shaft 6, has a bias which may well be due partly to spring and partly to gravitational action, to turn upward into the position in which one or another of the shoulders 5 of the member 3, engages the pointer 2. The element 3 is engaged by, and turns with the arm 6' of a shaft 6. A spring 10 tends to hold a rocker 8 which is journalled on a pivot 9, in the position in which the rocker engages the lateral projection 7' of an arm 7 secured to the shaft 6, and thereby holds the latter in a position in which the shoulders 5 are all below the pointer 2.

A cam 11 which is carried by the constantly rotating power shaft 12, turns the rocker 8 about its pivot against the action of the spring 10, once during each revolution of the shaft. This allows the arm 7 to turn counter-clockwise, as seen in Fig. 1, until the corresponding angular movement of the shaft 6 is interrupted by the engagement of one or another of the shoulders 5 of the member 3 with the galvanometer pointer 2. The shoulders 5 are so arranged that the turning movement of the shaft 6 and arm 7 thus permitted, will be greater or less, according to the deflective position of the pointer 2 at the time. When the arm 7 thus turns counter-clock-wise, its lateral projection 7' engages and turns a secondary pointer element 14 into a position corresponding to the then deflection of the pointer 2. The secondary pointer 14 is loosely journalled on the shaft 6, and has a gravitational bias to turn in the clockwise direction as seen in Fig. 1, so that the arm 14 normally bears against the projection 7' of the arm 7.

At the end of each angular adjustment of the secondary pointer 14 into a position corresponding to the then deflection of the galvanometer 2, one or another of high, neutral and low steps or shoulders along the edge 15' of a locking member 15, engages the bottom wall of a slot 14' in the member 14 and thereby frictionally holds the latter in the position occupied by it when such engagement occurs. The locking part 15 is given a tendency to move into locking engagement with the secondary pointer 14 by the spring 10, but is periodically held out of such engagement by the action on a lateral projection from the member 15 of a projection 16A carried by a ratchet lever 16 pivoted at 16B.

The lever 16 has a spring bias to turn forward, in the clockwise direction as seen in Fig. 1, but throughout the major portion of each rotation of the shaft 12, the lever 16 is held in a retracted position by a cam 17 carried by said shaft and engaged by the cam follower roll 16D carried by the lever 16. The ratchet lever 16 is operatively connected to two pawls 16E and 16F cooperating with a toothed wheel 18. Each of said pawls is biased for movement into a position in which it does not engage the teeth of the wheel 18, but one or the other of the pawls is brought into engagement with the teeth of the wheel 18, on each forward or clockwise movement of the lever 16, by the locking part 15, if the latter is then at one side or the other side of its intermediate or neutral position, occupied when the galvanometer pointer 2 is in its neutral position.

The position assumed by the part 15 when in locking engagement with the secondary pointer 14, controls the action of the pawls 16E and 16F by virtue of the fact that the part 15 carries a pawl engaging spring arm $15^{11}$. The movement of the locking part 15 into the position in which its high shoulder of its edge 15' engages the secondary pointer 14, causes the arm $15^{11}$ to move the pawl 16E into operative engagement with the teeth of the ratchet wheel 18, and the clockwise or forward movement of the ratchet lever 16 then gives a clockwise adjustment to the ratchet wheel. Conversely, when the part 15 moves into the position in which its low shoulder of edge 15' engages the secondary pointer 14, the arm $15^{11}$ shifts the pawl 16F into operative engagement with the wheel 18, and the latter is then adjusted in the counter-clockwise direction.

The extent of the adjustment then given the wheel 18 is made dependent upon the position of the secondary pointer 14, as said position determines which of the various shoulders of an arm 16G carried by the lever 16 shall then engage a projecting portion $14^{11}$ of the secondary pointer 14 and thereby arrest the forward movement of the ratchet lever 16, after an extent of forward movement varying with the shoulder engaged. In the neutral position of the galvanometer pointer and secondary pointer 14, the projection $14^{11}$ of the latter engages the central shoulder 16G' of the arm 16G and the lever 16 is then held against any operative movement in the clockwise direction. When the secondary pointer position is more or less to one side or the other of its neutral positions, the portion $14^{11}$ engages an upper or lower shoulder of arm 16G more or less distant from the central shoulder 16G', and the lever 16 is then permitted more or less forward movement.

The rotation of the wheel 18 in one direction or the other, effects corresponding potentiometer rebalancing adjustments, and corresponding position adjustments are effected by means of a rheostat shaft 19 which is geared to the shaft 18' on which the wheel 18 is secured. The rotation of the shaft 19 moves a bridging contact 20 along the convolutions 21 of a potentiometer slide wire resistance helically disposed about the axis of the shaft 19, and thereby varies the amount of said resistance in the potentiometer circuit. The resistance adjustments made in response to a deflection of the galvanometer pointer in either direction away from its neutral position rebalances, or tends to rebalance, the potentiometer circuit and thereby returns, or tends to return, the galvanometer pointer to its neutral position.

The rotation of the wheel 18 adjusts the recorder carriage 23 by virtue of the fact that the teeth of the wheel 18 are in mesh with the teeth of a gear carried by a carriage adjusting shaft 22. The latter is formed with a thread groove 22' of coarse pitch, which receives a cam or mutilated screw thread rib (not shown) secured to the carriage 23, so that the latter is moved longitudinally of the shaft 22 as the latter is rotated. The record sheet 26 passes over and is given feeding or advancing movements by a record feed roll 27. The latter is intermittently rotated by means of a worm and screw connection between the shaft of the roll 27 and a transverse shaft 28, and connection including a ratchet and lever (not shown) between the shafts 28 and 12.

Referring more particularly to Figure 3, the details of the printing mechanism will now be described. This printing mechanism consists essentially of three parts, a supporting part for the entire mechanism to keep it correctly positioned, a moving part to shift it longitudinally, and a tilting part upon which the printing and inking wheels are mounted and with which they are moved into engagement with the chart in order to record the values being measured. The supporting part comprises a journal 33 that is slidable along a shaft 32 and has teeth thereon to engage the splines on said shaft so that it may be rotated as the shaft is rotated. Mounted on this journal is a generally U-shaped member 34 whose forward end is bent at right angles to the side of the instrument and carries a roller 35 adapted to ride on one edge of a channel member 36 fastened across the front of the instrument between side plates thereof, one of which is shown at 31. Attached to the inturned end, and extending below and then up in front of the channel member 36, is a pointer 37 that cooperates with a scale 38 attached to the channel member to indicate the position of the carriage and, therefore, the temperature of the condition being measured.

The moving part of the print mechanism consists of a journal 39 formed with a tooth therein that surrounds shaft 22. The tooth enters the helical thread 22' on the shaft so that any rotation of the shaft will move the journal therealong. Formed integral with and extending above journal 39 is a member 40 that has an arm 44 extending forwardly from it. This arm is attached by a screw, or other means, to the side of member 34. The effect is that rotation of shaft 22 will move journal 39 therealong, and by means of arm 44, the member 34 will be moved the same amount.

The tilting part comprises a member 45 having its lower end bent at a right angle so that a roller 46 attached thereto may extend into the groove of a channel member 76 for a purpose to be later described. Extending from the inner face of member 45 are three stud shafts 47, 48 and 49 that have mounted for rotation on them, respectively, gears 50, 51 and 52. Gears 50 and 51 mesh with and are driven by a gear 53 that is rigidly attached to the journal 33, while gear 52 is driven by gear 51 to rotate in a direction opposite to gear 50. Gear 50 has a journal formed therewith upon which is mounted a print wheel 54 that has raised portions 55 on the surface thereof formed in the shape of the characters it is desired to print.

A journal is also formed on gear 52, and mounted upon it is an ink pad supporting member 58 whose surface is formed with a series of circular grooves in which are placed ink pads 61.

As many characters 55 and ink pads 61 or a multiple thereof are provided as there are records to be printed in accordance with the measurement to be made by the instrument. When a new measurement is to be taken, the shaft 32 is rotated in a manner to be described, and this in turn rotates gears 50, 51 and 52 to bring a character 55 into printing position over the chart 26. As this occurs, another character is brought into engagement with its ink pad to place a supply of ink thereon.

When a new measurement is to be made by the instrument, the galvanometer is switched into circuit with a thermocouple that is located at the point where the measurement is to be taken. Since the value of the new measurement may differ considerably from the one previously made, it may be necessary for the instrument to make several cycles before the galvanometer is brought into balance, and the shaft 22 is rotated enough to place a character 55 at the correct position over the chart 26. Because of this fact, a predetermined number of cycles is made between each indexing and printing operation. To this end, lever 8 which has a roller 8A on it and which is oscillated once by cam 11 for each cycle of the instrument, has a link 64 pivoted thereto, the other end of which is attached to a plate 65 that is mounted to oscillate on a journal 69, which in turn moves around shaft 66 that extends between the side plates of the instrument and which supports the chart roller 27. Oscillation of plate 65 around shaft 66 rotates, by means of a pawl 67 attached to the plate, a ratchet wheel 68 that is attached to the journal 69. A second pawl 67A prevents retrograde movement of ratchet 68. The ratchet 68 and journal 69, therefore, make one complete rotation for a predetermined number of cycles of the instrument, which in this case is shown as being twelve since there are twelve teeth on the ratchet 68.

Normally the lever 8 moves an amount in a clockwise direction in Figure 4 that is limited by engagement between this lever and the core 79 of a solenoid 80 attached to side plate 31. The movement of lever 8 is insufficient to move pawl 67 off the edge of a tooth on ratchet 68 as shown in dotted lines in Figure 4. When the movable core or plunger 79 is removed from the path of lever 8, that lever can turn clockwise an amount limited by the movement of cam roller 8A into depression 11A of the cam 11. This permits the pawl 67 to move beyond the edge of a ratchet tooth, so that the ratchet will be rotated. The operation of the plunger 79 will be described below.

A cam 70 is attached to journal 69 for rotation therewith which cam serves to determine the printing movements of the characters 55. A pin projecting from the cam actuates the indexing mechanism. Bearing on the surface of cam 70 is a roller 72 that is mounted on an off-set end of a lever 74, which oscillates around the splined shaft 32 and which is biased in a counter-clockwise direction by a spring 75. The rear end of lever 74 is attached to a channel member 76, to the other end of which is attached a lever (not shown) also oscillatable around shaft 32 and similar to the back half of lever 74. As the cut-out portion 70A of cam 70 comes under an edge 73 of lever 74, this lever turns counter-clockwise under the bias of spring 75 to move the channel member 76 upwardly. Since roller 46 on member 45, carrying the print wheel 54 and ink pad wheel 58, is in the channel of member 76, this roller 46 will be lifted upwardly, and member 45 will be pivoted around the journal 33 to move a character 55 into contact with the chart to make an impression thereon. It will be seen that the leading edge of cut-out portion 70A is abrupt, so that when it comes under edge 73, that edge will move down very quickly to make a sharp impression on the chart, while the following edge of the cut-out portion 70A will act on roller 72 to move lever 74 clockwise to lower channel member 76 and raise the character 55 from the chart.

Immediately after the printing has taken place, the instrument is indexed to bring another printing character 55 into printing position and to set up a control circuit so that no more printing can take place until another thermocouple is placed in the galvanometer circuit. The indexing is accomplished by a pin 77 that projects from the cam 70. Once during each revolution of the cam, the pin 77 engages a toothed wheel 78 and rotates it the distance of one tooth.

Shaft 82, upon which the wheel 78 is mounted, extends through to the other side of the instrument, and when it is rotated, through gearing not shown, rotates a shaft 83 of a switch 84 in the control circuit mentioned above. Rotation of this shaft 82 also, through suitable gearing, rotates the splined shaft 32 to move another character 55 into printing position, ready for the next impression to be made on chart 26, as cut-out portion 70A again comes under edge 73.

The operation of the device should be apparent from the above detailed description, but a short résumé will now be given. Starting with the parts in the positions they assume after an indexing operation has been performed; the subsequent cycles of the instrument will balance the galvanometer and thereby rotates shaft 22 to shift the printing mechanism to its proper position above the chart. The balancing operations will also rotate cam 70 through the pawl and ratchet mechanism 67, 68 by movement of the lever 8, assuming that plunger 79 is out of the path of lever 8. When the cut-out portion 70A of cam 70 moves under edge 73, the channel member 76 will be lifted under the bias of spring 75, to move a character 55 into engagement with the chart. The same cycle of the instrument that permits printing will also move the following edge of cut-out portion 70A under roller 72 to lift the character 55 from the chart, thus making a clear-cut impression. The next cycle of the instrument will cause pin 77 to move toothed wheel 78. As this wheel rotates, its shaft 82 will adjust the shaft 83 to set up the control circuit, and will also rotate shaft 32 to bring another character 55 into printing position.

As shown in the drawings, the print wheel 54 has twelve printing characters 55 on it and the toothed wheel 78 has twelve teeth on it. The arrangement is such that the pin 77 moves the wheel one-twelfth of a revolution upon each rotation of cam 70 and the wheel 78 is geared to shaft 32 to rotate the shaft and print wheel 54 the same angular distance. The shaft 83 of a switch 84 (Fig. 2) is geared to shaft 82 so that it is rotated one-third of the amount the wheel 78 is rotated. Since, as shown herein, there are only four thermocouples to be connected to the instrument one revolution of each of parts 54 and 78 will take place during the time that three records of each thermocouple temperature is being made, while the shaft 83 will make three complete revolutions during the same time.

As shown in Figure 6, the kiln A consists of a rotating drum 85 which is provided at each end with tracks 86 that are supported for rotation upon the rollers 87. The drum may be rotated in any conventional manner. The outlet end of the drum is covered by a head 88 through which extend pipes for supplying fuel and combustion air to the kiln. The lower end of this head 88 is funnel shaped and is provided with an opening 89 through which the product of the kiln is delivered. The other end of the kiln is provided with head 91 through which the exhaust gases from the kiln pass and into which extends a delivery pipe 92 through which the material being treated is supplied.

Surrounding the drum 85 near one end thereof are four pairs of slip rings 93, 94, 95 and 96 each of which extends substantially one quarter of the way around the drum 85. These rings are connected to the extension wires from thermocouples 97, 98, 99 and 100 respectively, which are located 90° apart in the interior of the drum and which are spaced axially of the drum so that the temperature as measured thereby will give an indication of a temperature gradient along the drum. The slip rings successively engage a pair of stationary brushes 101 as the drum rotates so that the E. M. F. of the thermocouples may be conducted through these brushes and a cable 102 to the galvanometer of the potentiometer instrument B. It should be noted that the respective slip rings and thermocouples are so located that, as the drum rotates, the thermocouples are connected to the instrument in such a fashion that temperatures from one end to the other end of the drum will be recorded so that each group of four successive records made on the chart of the instrument B will show the temperature gradient of the kiln.

Figure 7:
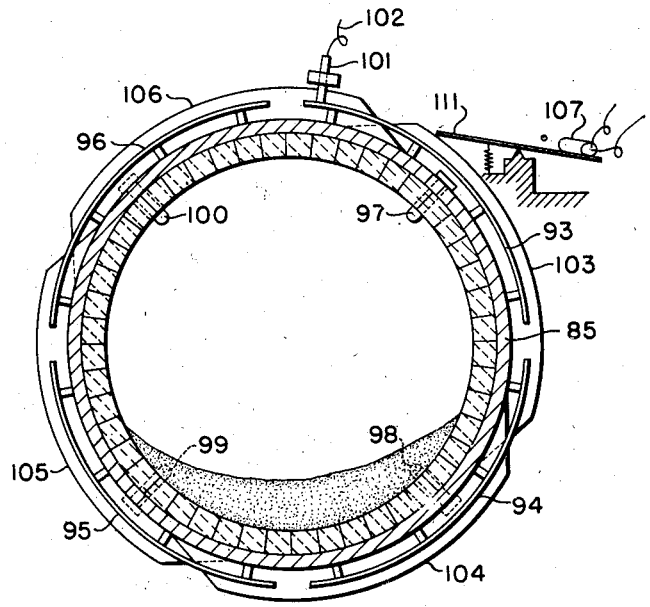

Also extending circumferentially around the drum and axially spaced from each other are four switch operating members 103, 104, 105, and 106. These members, as shown best in Figure 7, consist of raised portions that are successively used to close switches 107, 108, 109 and 110 respectively. These switches are mounted on suitable pivoted supports 111. It will be seen that if the switches are mounted side by side along the drum and adjacent thereto that they will be successively closed by the switch actuating members as the drum rotates. These switch actuating members and switches are so mounted on the rotating drum with respect to the thermocouples that switch 107 will be closed when thermocouple 97 is connected to the instrument B. Each of the switches is provided with two terminals, one of which is connected to one side of the line, and the other of which is connected respectively to segments 112, 113, 114 and 115, of the switch 84 that has previously been mentioned. When the switch 107, for example, is closed a circuit will be completed from one side of the line through the switch to the segment 112. From there the circuit extends through a brush 116 that is rotated by the shaft 83 of the switch to a conductor ring 117 and to one terminal of the solenoid 80. The other terminal of the solenoid extends directly to the opposite side of the line.

Figure 5:
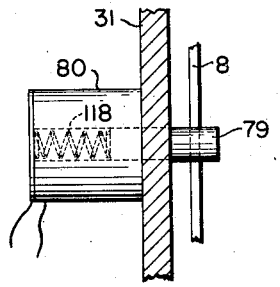
Figure 5 is a section taken on line 5—5 of Figure 4.

In describing the operation of the system it must be remembered that the potentiometer is capable of printing successive records of temperature faster than the kiln can rotate to bring successive thermocouples to recording positions. For purposes of description it may be assumed that the kiln has rotated to a position in which slip rings 93 are under brushes 101, thereby connecting the thermocouple 97 with the galvanometer 2. This takes place while the thermocouple is moving through the top quarter of its path so that it will be exposed to the gases in the kiln rather than to the material being treated. At the same time the switch operating member 103 will have moved to a position in which it has closed the switch 107. This closes a circuit through the switch 107, segment 112 and solenoid 80 to energize that solenoid and move core 79 to the left in Figure 5 so that it will no longer obstruct the path of the lever 8.

As the instrument continues to operate, the lever 8 can move through its full stroke so that upon each revolution of the cam 11 the roller 8A on lever 8 will ride into the low portion 11A of the cam. When this occurs the pawl 67 will fall behind the next tooth on ratchet 68 so that upon counter-clockwise movement of the lever 8 the ratchet is rotated the distance of one tooth. It will be noted that the ratchet 68 has twelve teeth. The arrangement is such that the instrument can balance itself and move the pen carriage from one end to the other of the chart during ten cycles. Therefore no matter how far apart consecutive records may be on the chart the instrument will have time to balance itself and properly position the print wheel. On the eleventh cycle of the instrument the ratchet will have been advanced far enough to bring the low portion 70A of cam 70 under edge 73 so that a record of the temperature of the thermocouple 97 will be made on the chart 26. On the twelfth cycle of the instrument the pin 77 will rotate wheel 78 the distance of one tooth.

When wheel 78 is rotated two things occur. First the print wheel is rotated to place another printing character in position to make the next record. Second, the shaft 83 of switch 84 is rotated enough so that member 116 bridges segment 113 and conductor ring 117. This latter operation breaks the circuit for solenoid 80 so that a spring 118 may move the plunger 79 back into the path of the lever 8. Thereafter the instrument will continue to operate to move the print wheel carriage and pointer 37 along the scale 38 so that the value of the condition will be indicated, but no record can be made because ratchet wheel 68 cannot be advanced. This continues until the kiln has rotated enough to bring the slip rings 94 under the brushes 101. Substantially simultaneously the switch closing member 103 will be moved enough, so that switch 107 can open and switch closing member 104 will operate to close switch 108 to again complete a circuit for solenoid 80. Plunger 79 is again removed from the path of lever 8 and then ratchet wheel 68 can be advanced to drive cam 70 to a position where the above operation is repeated to make a record of the temperature of thermocouple 98.

While the system has been shown recording the temperatures of only four thermocouples, it will be obvious that other numbers of thermocouples could be used if desired. It is only necessary to be sure that the kiln is rotating at such a speed that each pair of slip rings will stay under the brushes 101 long enough for the instrument to make at least twelve cycles. If a faster balancing instrument were used, fewer teeth could be used on the ratchet 68 and fewer cycles of the instrument would be necessary between records.

From the above description it will be seen that I have provided a temperature recording system in which the connecting of the recording instrument to successive thermocouples is controlled by a means external of the recording instrument. The system also is provided with means to insure that only a single record is made of each temperature, but the instrument indicates the temperature of each thermocouple all of the time it is connected thereto after the instrument has first come into balance. Means are also provided so that the instrument and kiln are so synchronized that the same printing characters on the print wheel are always used to make records of the temperatures of the same thermocouples. This is of particular value if the kiln is rotating at various speeds as is often the case.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a recording system, a multiple recording instrument having recording means and mechanism to operate said recording means, a plurality of condition responsive elements, means to connect said elements to said instrument in sequence, a plurality of circuit closing members, one for each element, means to move one of said circuit closing members to circuit closing position each time an element is connected to said instrument, a circuit in which each circuit closing member is located, means common to each circuit and operated upon opening of the circuit to restrain the recording means of said instrument from making a record, and other means common to each circuit and operated by said mechanism to open the circuit which was closed when a record is made to thereby open said circuit whereby said common means can restrain the operation of said recording means.

2. In a recording system, a multiple recording instrument, a rotary furnace, a plurality of thermocouples located in said furnace, means controlled by the rotation of said furnace to connect successively said thermocouples to said instrument, recording means in said instrument to make a record of the temperature of the thermocouple then connected to said instrument, mechanism to move said recording means to recording position, means to at times withhold operation of said mechanism, means controlled by said furnace to act on said withholding means to prevent operation thereof each time a new thermocouple is connected to said instrument, and means operated by said mechanism to release said withholding means each time a record is made by said recording means.

3. In a recording system, a self balancing multiple recording instrument, recording means in said instrument, mechanism to operate said recording means, electric stop means to render said mechanism inoperative, means to connect sequentially a plurality of condition responsive elements to said instrument, an electric circuit for said electric stop means having circuit opening and circuit closing means, means to operate said circuit closing means substantially simultaneously with the connection of a new element to said instrument to operate said circuit for said stop means to render the same inoperative, and means to operate said circuit opening means by said recording means upon the making of a record to render said stop means operative.

4. In a multiple recording instrument, means to successively record the value of a plurality of conditions, means to successively connect a plurality of condition responsive elements to said instrument, continuously operating means to actuate said recording means, means to interrupt the operation of said recording means, means to withhold the action of said interrupting means, and means operated when a condition responsive element has been connected to the instrument to actuate said means to withhold until a record has been made.

5. In a measuring system, a recording instrument, a plurality of condition responsive elements, means to connect successively said elements to said instrument, recording means, continuously operating means operative to produce a record by said recording means, electrical means to render said continuously operating means inoperative at times, a plurality of electric circuits to control the operation of said electrical means, means operated by said means to connect to operate a circuit for said electrical means to place it in a condition whereby a record can be made, and means operated by said continuously operating means upon the making of a record to operate said circuit to place said electrical means in a position to render said continuously operating means inoperative until another element is connected to said instrument.

6. In a recording system, a multiple recording instrument having recording means and mechanism to operate said recording means, a plurality of condition responsive elements, means to connect sequentially said elements to said instrument whereby a record of their values may be made, means to restrain said recording means from operating, a plurality of means equal to the number of elements and operated by said means to connect to cause said restraining means to be inoperative each time a new element is connected to said instrument, and means to nullify the effect of the means to cause said restraining means to be inoperative operated by said mechanism each time a record is made by said recording means.

7. In a recording system, a multiple recording instrument, means in said instrument to make a record of the value of a plurality of conditions, means to connect sequentially a plurality of condition responsive elements to said instrument, means to withhold operation of said recording means, means operated in synchronism with the connection of a new element to said instrument to render said withholding means operative, and means inoperative upon the making of a record of the value of the condition to which said element is subjected to render said withholding means operative.

8. In a recording system, a self-balancing type recording instrument adapted to sequentially record the value of a plurality of conditions, indicating and recording means, continuously operating means to move said indicating and recording means to a position corresponding to the value of a condition, mechanism to operate said recording means to make a record of the value of the condition then being measured, stop means to render said mechanism inoperative when said record has been made without affecting said continuously operating means, means operating independently of said instrument to connect sequentially a plurality of condition responsive elements to said instrument whereby a record of the value of the same may be made, and means to render inoperative said stop means between the time a new element is connected to said instrument and the time a record of the value of the same is made.

9. In an instrument, indicating means, recording means, continuously operating means to operate said two first mentioned means, means operating independently of said instrument to connect successively to said instrument a plurality of condition responsive means, means to withhold operation of said recording means by said continuously operating means when a record of the value of a condition has been made, without affecting the operation of said indicating means and means to render said withholding means inoperative upon the connection of a new element to said instrument until a record has been made, whereby said instrument may continuously indicate the value of the condition to which the element then connected to the instrument is subjected but only a single record of the value thereof will be made regardless of the time each element is connected to the instrument.

10. In an instrument, indicating means, recording means, means to connect successively a plurality of condition responsive elements to said instrument at predetermined intervals, means to shift said indicating means and recording means to a position corresponding to the value of the condition of the element then connected to the instrument, continuously operating means to move said recording means to make a record of the value of the condition of the element then connected to the instrument at intervals less than said predetermined intervals, and means to render said continuously operating means inoperative to move said recording means a second time during each predetermined interval, whereby said instrument will continuously indicate the value of the condition of the elements as they are successively connected thereto, but can only make one record of each condition value.

11. In a recording system, a recording instrument including recording means and indicating means, a plurality of condition responsive elements, means operative independently of said instrument to connect at intervals said elements to said instrument, mechanism in said instrument to move said recording means and said indicating means to positions corresponding to the value of the condition to which the element then connected to the instrument is subjected, means to operate said recording means to make a record at intervals less than said first mentioned intervals, and means to render said operative means inoperative during the remainder of each of said first intervals whereby only one record will be made by said recording means during each of said first mentioned intervals.

EDGAR M. SMITH.

REFERENCES CITED

The following references are of record in the file of this patent:

UNITED STATES PATENTS

| Number | Name | Date |
|---|---|---|
| 2,207,343 | Fairchild | July 9, 1940 |

Certificate of Correction

Patent No. 2,428,129. September 30, 1947.

EDGAR M. SMITH

It is hereby certified that errors appear in the printed specification of the above numbered patent requiring correction as follows: Column 12, line 3, claim 7, for the word "operative" read *inoperative*; line 4, same claim, for "inoperative" read *operative*; and that the said Letters Patent should be read with these corrections therein that the same may conform to the record of the case in the Patent Office.

Signed and sealed this 27th day of January, A. D. 1948.

[SEAL]

THOMAS F. MURPHY,
*Assistant Commissioner of Patents.*